(12) United States Patent
Bielawski et al.

(10) Patent No.: US 8,372,537 B2
(45) Date of Patent: Feb. 12, 2013

(54) BATTERY WITH A MOLDED IN-FRONT TERMINAL

(75) Inventors: Matthew Bielawski, Milwaukee, WI (US); David Thuerk, Brookfield, WI (US); Guy Pfeifer, Milwaukee, WI (US); Mark Inkmann, Wauwatosa, WI (US)

(73) Assignee: C&D Technologies, Inc., Blue Bell, PA (US)

( * ) Notice: Subject to any disclaimer, the term of this patent is extended or adjusted under 35 U.S.C. 154(b) by 1015 days.

(21) Appl. No.: 12/156,571

(22) Filed: Jun. 3, 2008

(65) Prior Publication Data

US 2009/0297943 A1    Dec. 3, 2009

(51) Int. Cl.
*H01M 2/02* (2006.01)

(52) U.S. Cl. ........ 429/183; 429/178; 429/179; 429/181; 429/182

(58) Field of Classification Search .................. 429/178, 429/179, 181, 182, 183
See application file for complete search history.

(56) References Cited

U.S. PATENT DOCUMENTS

| | | |
|---|---|---|
| 3,711,335 A | 1/1973 | Daniel |
| 3,767,467 A | 10/1973 | Miller et al. |
| 4,156,756 A | 5/1979 | Green |
| 4,207,390 A | 6/1980 | Oehrlein et al. |
| 4,239,841 A | 12/1980 | Rorer |
| 4,304,827 A | 12/1981 | Clingenpeel |
| 4,337,301 A | 6/1982 | Rorer et al. |
| 4,346,282 A | 8/1982 | Eberle |
| 4,351,890 A | 9/1982 | Oxenreider |
| 4,396,692 A | 8/1983 | Eberle |
| 4,419,815 A | 12/1983 | Rorer et al. |
| 4,446,214 A | 5/1984 | Mocas |
| 4,455,357 A | 6/1984 | Rorer et al. |
| 4,472,486 A | 9/1984 | Orsino et al. |
| 4,482,618 A | 11/1984 | Orsino et al. |
| 4,729,934 A | 3/1988 | Krystaszek |
| 4,883,729 A | 11/1989 | Anderson |
| 5,281,493 A | 1/1994 | Jones |
| 5,296,317 A | 3/1994 | Ratte et al. |
| 5,422,202 A | 6/1995 | Spiegelberg et al. |
| 5,425,170 A | 6/1995 | Spiegelberg et al. |
| 5,445,907 A | 8/1995 | Ito et al. |
| 5,589,294 A | 12/1996 | Spiegelberg et al. |
| 5,791,183 A | 8/1998 | Spiegelberg et al. |
| 5,814,421 A | 9/1998 | Spiegelberg et al. |
| 6,027,831 A | 2/2000 | Inoue et al. |
| 6,033,801 A | 3/2000 | Casais |
| 6,156,452 A | 12/2000 | Kozuki et al. |
| 6,372,382 B2 | 4/2002 | Peterson |
| 7,163,764 B2 | 1/2007 | Ratte |
| 7,364,394 B2 | 4/2008 | Ramasamy |
| 2002/0114994 A1 | 8/2002 | Yabuki et al. |

FOREIGN PATENT DOCUMENTS

JP            61008847           1/1986

*Primary Examiner* — Patrick Ryan
*Assistant Examiner* — Ladan Mohaddes
(74) *Attorney, Agent, or Firm* — Hoffmann & Baron, LLP

(57) ABSTRACT

A battery with a threaded battery terminal for accommodating a threaded terminal bolt is provided. The threaded battery terminal includes a bushing having an axial bore extending between an open end and a closed end; and an insert having a longitudinal axis and a threaded opening extending along the longitudinal axis between an open end and a back wall. The terminal bolt is threadably received in the threaded opening and the back wall of the insert has sufficient strength to cause an overlong bolt to break upon continued threaded insertion subsequent to the bolt contacting the back wall.

3 Claims, 8 Drawing Sheets

SECTION A-A

SECTION B-B

SECTION C-C

SECTION E-E

BATTERY WITH A MOLDED IN-FRONT TERMINAL

FIELD OF THE INVENTION

The present invention is a battery with a front terminal. In particular, the present invention relates to a front mounted battery terminal that is molded into the battery casing.

BACKGROUND OF INVENTION

Battery terminals for automobile, industrial and other uses are typically connected using either posts which extend from the top of the battery casing or threaded connections in the sides of the battery casing. Connections to threaded terminals are generally made using a lug and a bolt that is threaded into the battery terminal and tightened with a wrench. The battery terminal is molded into the side wall of the battery casing and includes a bushing and a threaded insert inside the bushing, which receives the bolt.

A common problem encountered with threaded battery terminals is that over-torquing an overlong bolt forces the bolt through the bottom wall (also referred to as the back wall) of the insert and can either damage the weld zone that connects the terminal to the battery plates or rupture the battery casing and make the battery unusable. A variety of different terminal designs have addressed this problem but none of them have been completely successful.

One of the problems encountered in designing a battery terminal insert that can withstand over-torquing and overlong bolts is the limited amount of space in the battery casing. Industrial batteries are typically mounted in racks or cabinets that are constructed for standard size batteries. Any replacement battery has to have the same "footprint" as a standard size battery in order to be an acceptable replacement. If the footprint of the battery is increased to accommodate a larger battery terminal insert, the footprint of the battery will be too big to fit in standard racks and cabinets. If the battery casing is reduced in size to allow room for a larger battery terminal insert, the battery cells will be smaller and the battery will have less power. Therefore, two of the considerations in designing a battery terminal insert are that the insert cannot change the size of the battery footprint and that the insert must not extend too far into the battery casing. Accordingly, there is a need for a battery terminal insert that extends a minimal distance into the battery casing and can provide a proper connection using a minimum number of threads. There is also a need for a battery terminal insert that can withstand over-torquing and overlong bolts without permanently damaging the battery.

SUMMARY OF THE INVENTION

In accordance with the present invention, a battery with a threaded battery terminal for accommodating a threaded terminal bolt is provided. The threaded battery terminal includes a bushing having an axial bore extending between an open end and a closed end; and an insert having a longitudinal axis and a threaded opening extending along the longitudinal axis between an open end and a back wall. The terminal bolt is threadably received in the threaded opening and the back wall of the insert has sufficient strength to cause an overlong bolt to break upon continued threaded insertion subsequent to the bolt contacting the back wall. The back wall is designed so that it deforms less than or equal to 0.010 inch when the terminal bolt contacts the back wall and is rotated with a torque of up to about 193.9 in-lbs.

The back wall of the insert has a minimum thickness of 0.170 inches. The insert is formed in the bushing by a molding process and the insert is preferably made from brass and the bushing is made from lead. When the bolt has a thread engagement in the insert of 0.235 inches or more, the bolt breaks before the insert threads are damaged by continued rotation of the bolt.

In another embodiment, the threaded battery terminal includes a bushing having an axial bore extending between an open end and a closed end; and an insert having a longitudinal axis and a threaded opening extending along the longitudinal axis between an open end and a back wall. The insert is formed within the bushing and the threaded opening is adapted to receive a bolt. When an overlong bolt is threaded into the opening and contacts the back wall with a torque of up to about 193.9 in-lb, the back wall deforms less than or equal to 0.010 inch.

BRIEF DESCRIPTION OF THE FIGURES

The preferred embodiments of the insert for a threaded battery terminal of the present invention, as well as other objects, features and advantages of this invention, will be apparent from the accompanying drawings wherein.

DETAILED DESCRIPTION OF THE INVENTION

Figure 1:
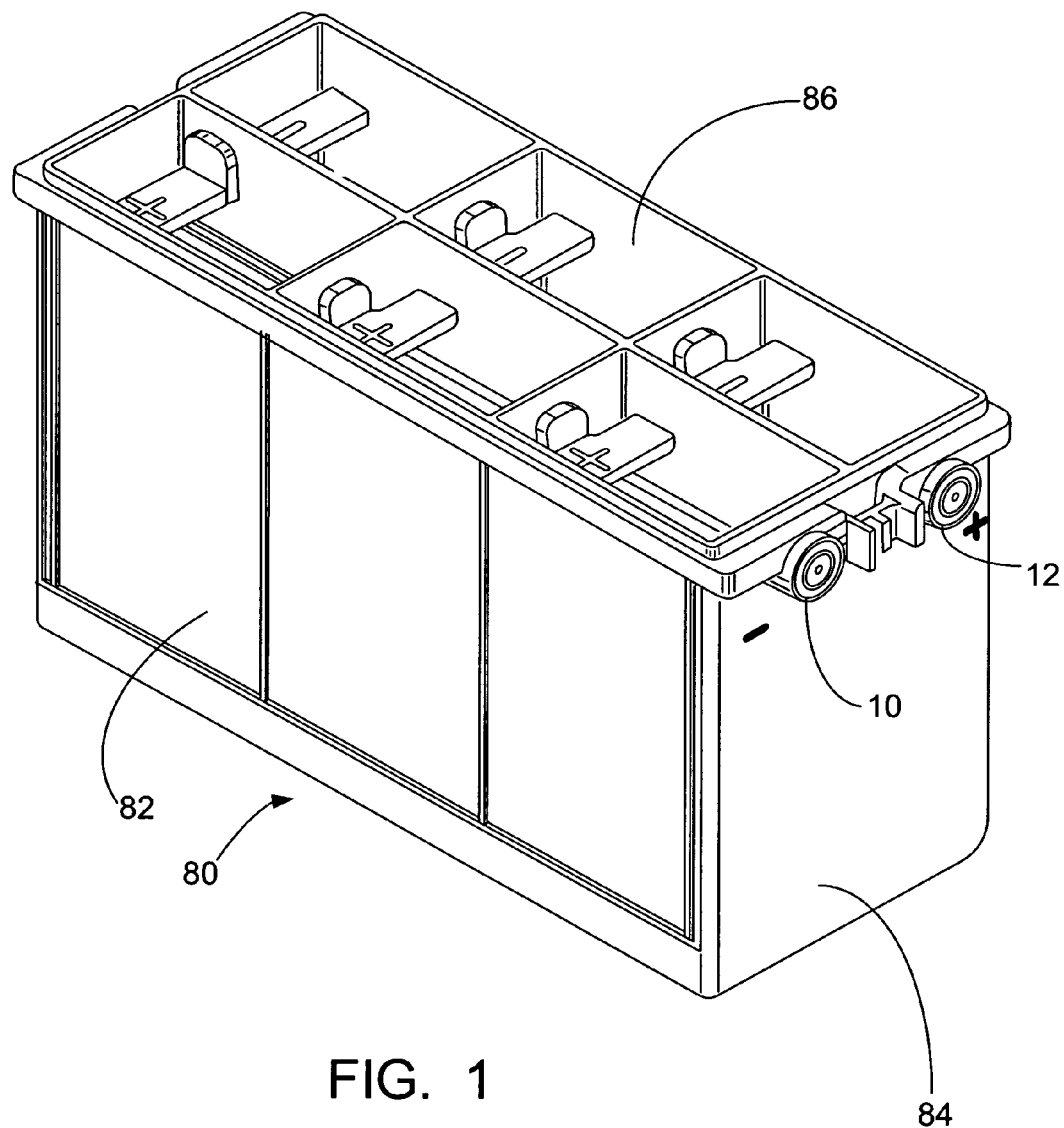
FIG. 1 is a top perspective view of an embodiment of a battery having end mounted terminals with the top cover removed.

The present invention is a bushing and insert for a battery terminal with a back wall that prevents damage to the battery when an overlong bolt threaded into the insert is over-torqued. As used herein, the term "overlong bolt" refers to a bolt that has a length measured from the bottom of the bolt head to the threaded end of the bolt that exceeds the depth of the threaded opening in the insert. The back wall of the insert is designed to resist deformation from an over-torqued, overlong bolt beyond the break strength of the overlong bolt. This mean that the over-torqued, overlong bolt will break before the over-torquing significantly deforms or ruptures the back wall of the insert. The broken bolt can be removed from the insert using various methods known to those skilled in the art and replaced with a new bolt. Therefore, the battery casing and internals are not damaged and the performance and integrity of the battery is not compromised. In contrast, a "spun insert" (i.e., an insert that is over-torqued so that it spins freely in the bushing) in the prior art could not be repaired and the battery had to be replaced.

Another advantage of the present invention is that, when a bolt breaks in the insert, the battery is completely disconnected from the power source and the connection is terminated both electrically and structurally. In contrast, when inserts in prior art battery terminals are over-torqued, the insert separates and spins within the bushing. Since the bolt is still connected to the insert, the electrical connection may still exist and pose a danger to users from arcing and/or violent failure.

In order for the battery to fit in standard battery racks and cabinets, the terminal bushing/insert cannot change the battery footprint. Moreover, in order to maintain the battery performance (i.e., the power output), the bushing/insert cannot extend too far into the battery casing and decrease the size of one or more cells. In order to satisfy these requirements, the bushing/insert combination of the present invention is designed so that it does not deform when an overlong bolt is over-torqued. This is accomplished by designing the back wall of the insert with a drive through strength that is greater than the bolt break strength. As used herein, the term "drive through strength" is defined as the resistance to deformation from a bolt threaded into the insert and it is measured in terms of the torque exerted when tightening the bolt. For the purposes of the present disclosure, the back wall is consider to be resistant to deformation if it deforms less than or equal to 0.010 inch when an overlong bolt is threaded into the opening and contacts the back wall under a torque applied to the bolt. The term "bolt break strength" is defined as the amount of torque exerted in tightening a bolt that is required to break the bolt.

The back wall of the insert is designed to have a drive through strength that is higher than the bolt break strength so that the bolt breaks before the insert back wall deforms. This protects the weld zone (i.e., the region at the end of the battery terminal where the battery terminal is welded to a connector attached to either the positive or negative plate) from a "long bolt situation." A "long bolt situation" results when too long a bolt is used (i.e. the threaded portion of a bolt is longer than the insert). After the bolt contacts the back wall of the insert, the user continues to turn the bolt, causing the back wall of the insert to deform or rupture and damage the weld zone. If the weld zone is disturbed, arcing can occur, resulting in a violent and dangerous failure. The long bolt situation is exacerbated by the design constraints, which limit how far the insert can extend into the battery casing. An insert with a shallow depth and fewer threads is more susceptible to damage if a long bolt is mistakenly used.

Stainless steel bolts of the type generally used to secure a busbar to a battery terminal were tested and found to break when subjected to a torque of about 180.7 in-lb (i.e., 180.7 inch-pounds). Accordingly, the back walls of the inserts of the present invention are designed to endure an overlong bolt threaded into the opening of the insert with a torque of at least 193.7 in-lb without deforming and causing damage to the weld zone of the battery.

Another problem addressed by the present invention is the stripping of the threads of the insert after the bolt has been fully inserted in the insert. As used herein, the term "fully inserted" refers to the condition where the bottom side of the bolt head contacts the insert, a busbar or a washer so that the threads of the bolt are no longer visible. It has been found that a minimum thread engagement is needed to prevent damage to the threads of the insert when a fully inserted bolt continues to be rotated. As used herein, the phrase thread engagement refers to the distance that the threaded end of a bolt extends into the insert. If the bolt does not reach the point of minimum thread engagement when fully inserted, continued rotation of the bolt strips the insert threads. However, once a bolt achieves minimum bolt insertion enough threads on the bolt have engaged the threads of the insert so that the torque required to rotate the bolt and strip the threads exceeds the threshold force for breaking the bolt head off the bolt. The supported head of a standard ¼×20×0.625 stainless steel bolt breaks when subjected to 202.7 in-lbs of torque. It has been found that a minimum thread engagement of 0.235 inches prevents insert thread failure. This engagement length results in a calculated average torque strength of 204.9 in-lb in order to cause insert thread failure.

Referring now to the drawings, FIG. 1 shows a 12-volt industrial battery 80 with six cells 86 with the top cover (not shown) removed. The battery 80 has negative and positive terminals 10, 12 mounted on one of the end walls 84. This is somewhat different than typical batteries which have the terminals on a side wall 82. The terminals 10, 12 are used to connect the battery 80 to a busbar 76 using a bolt 70 (see FIGS. 17 and 18).

Figure 2:
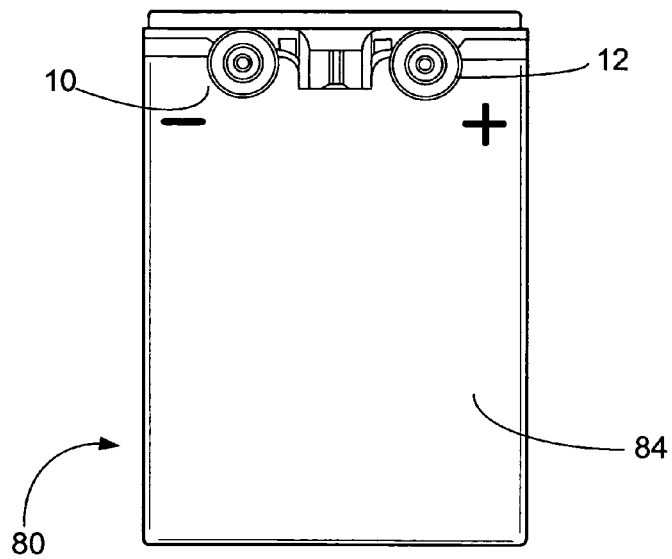
FIG. 2 is an end view of the battery shown in FIG. 1 having end mounted terminals.
Figure 3:
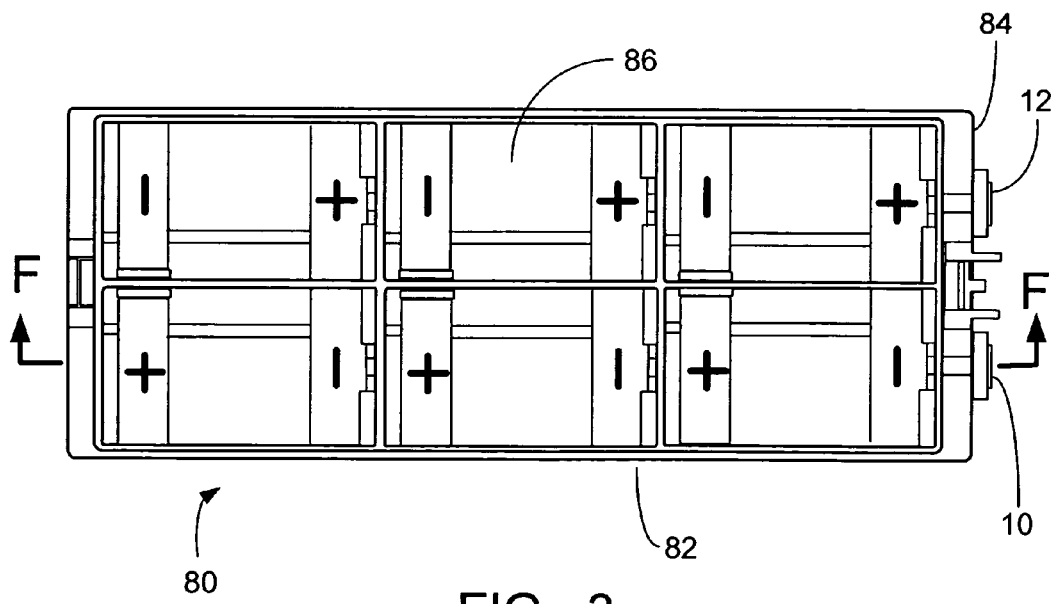
FIG. 3 is a top view of the battery shown in FIG. 1 having end mounted terminals.
Figure 4:
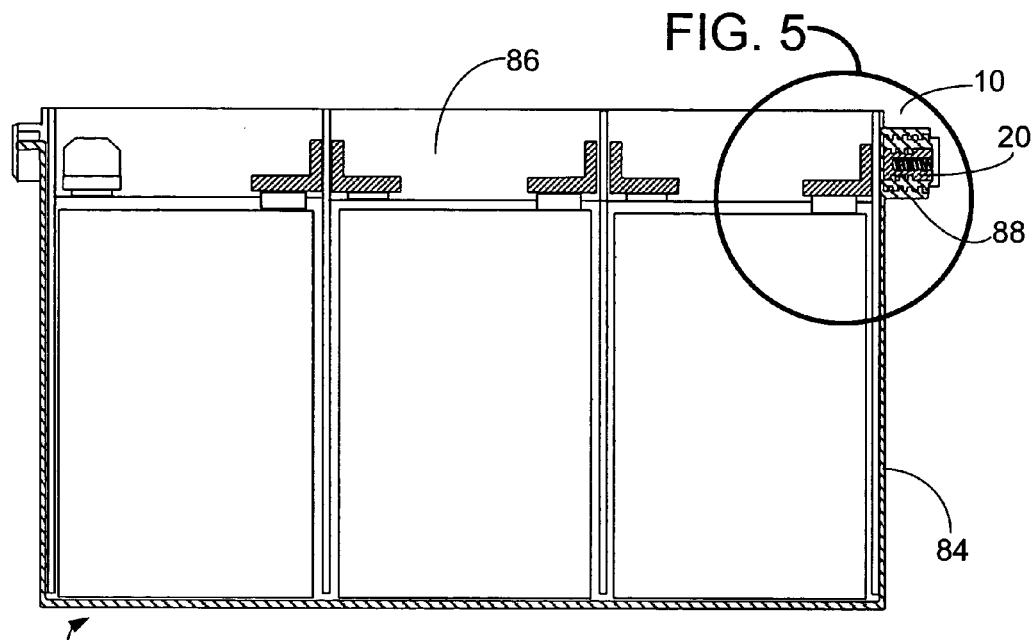
FIG. 4 is a sectional view of the battery shown in FIG. 3.

FIG. 2 shows the end wall 84 of the battery 80 of FIG. 1 and the negative and positive terminals 10, 12. FIG. 3 shows a top view of the battery 80 with a section designated as F-F taken through the mid-point of the negative terminal 10. This sectional view of the battery 80 is shown in FIG. 4 and it illustrates how the negative terminal 10 is connected to the negative battery plate and how the plates in the adjacent cells 86 are connected. The negative terminal 10 in FIG. 4 is shown in more detail in FIG. 5.

Figure 5:
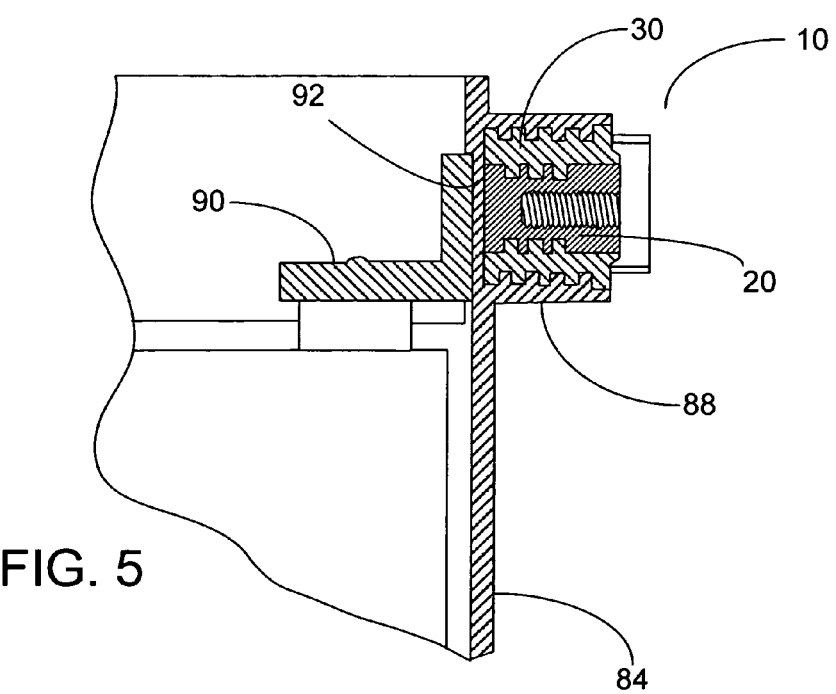
FIG. 5 is a detail view of the terminal for the battery shown in FIG. 4.

FIG. 5 is a detail view of the negative terminal 10 of the battery 80 and it shows a bushing 30 molded into the battery casing 88 and an insert 20 inside the bushing 30. A connector 90 inside the battery 80 connects the negative battery plate to the negative terminal 10. The region where the negative terminal 10 is welded to the connector 90 is known as the weld zone 92. If an overlong terminal bolt 70 (see FIGS. 17 and 18) is over-tightened, it can damage the weld zone and cause arcing.

Figure 6:
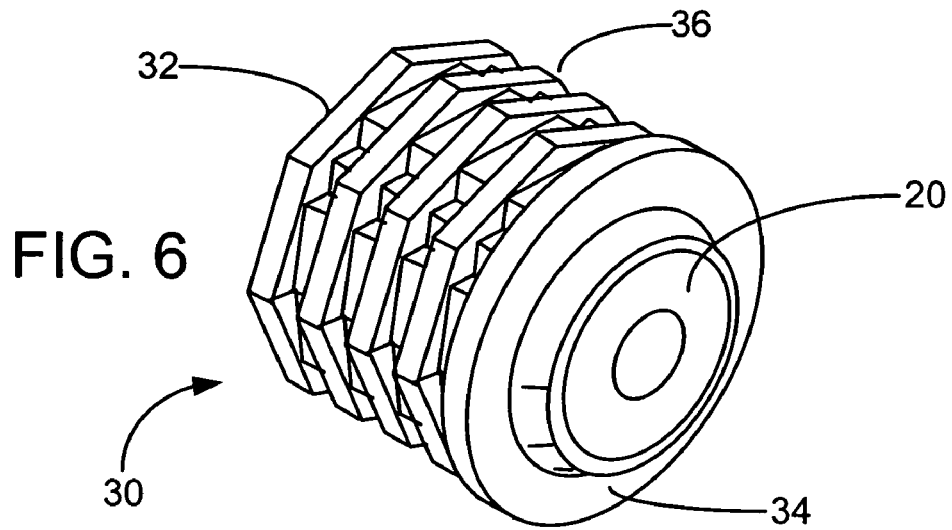
FIG. 6 is a perspective view of a bushing with an insert used in preferred embodiments of the battery terminals of the present invention.

FIG. 6 shows the bushing 30 with the insert 20 inside the open end 34. The closed end 32 of the bushing 30 is connected to the plate on the inside of the battery 80 via the connector 90 by the weld zone 92 (see FIG. 5). The outside of the bushing 30 is formed by a plurality of sections 36 that secure the bushing 30 in the molded battery casing 88. The present invention includes this design and other similar designs that are well known in the art.

Figure 7:
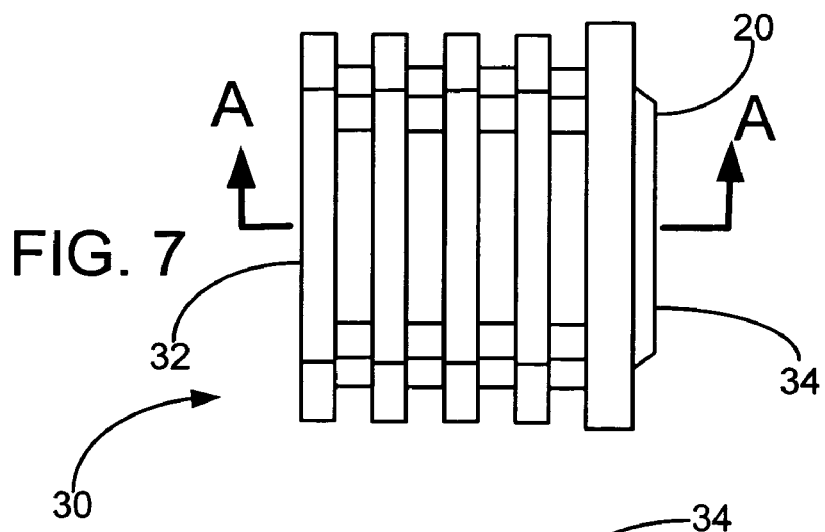
FIG. 7 is a side view of the bushing and insert shown in FIG. 6.
Figure 8:
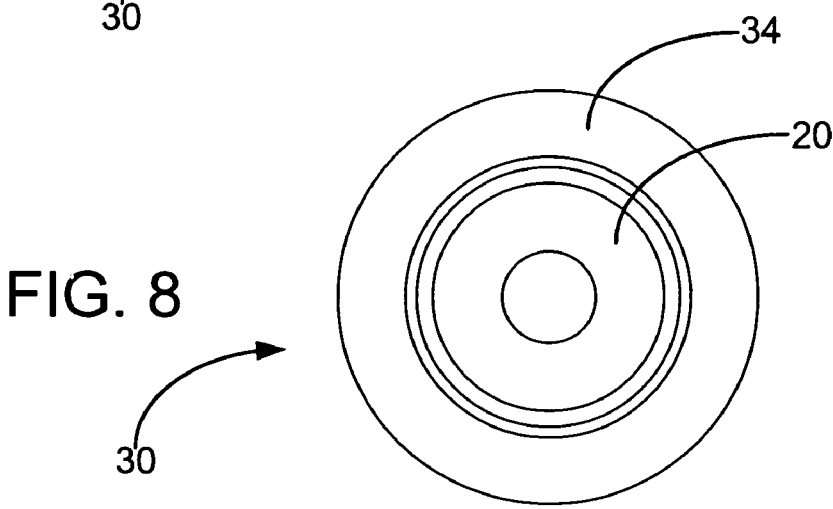
FIG. 8 is an end view of the bushing and insert shown in FIG. 6.
Figure 9:
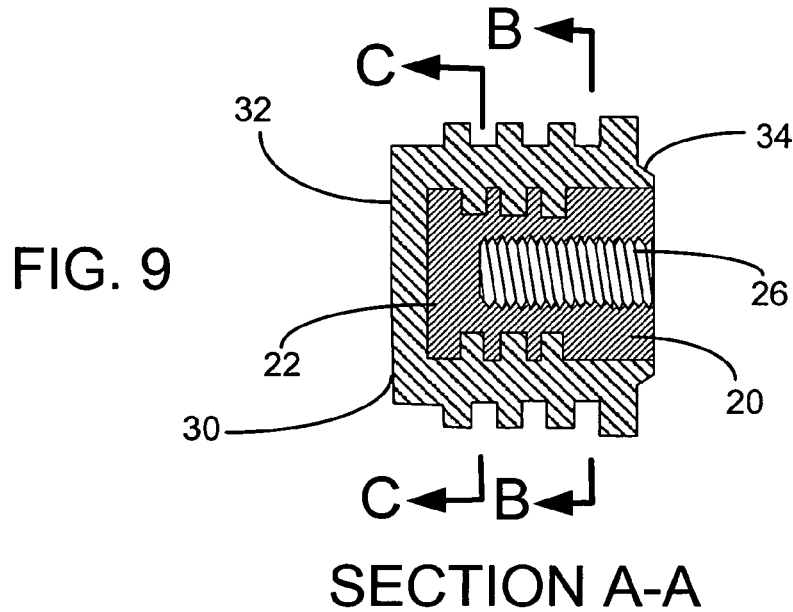
FIG. 9 is a sectional view of the bushing and insert shown in FIG. 7.

FIG. 7 is a side view of the bushing 30 and insert 20 shown in FIG. 6 with a section designated as A-A taken through the longitudinal axis. This sectional view is illustrated in FIG. 9. FIG. 8 is an end view of the open end 34 of the bushing 30 and the insert 20 shown in FIG. 6.

FIG. 9 shows section A-A of the bushing 30 and the insert 20 from FIG. 7. The sectional view shows how the insert 20 is formed in the bushing 30. The insert 20, which is typically made from brass, is machined into the desired shape and the bushing 30, which is typically made from lead, is molded around the insert 20. The closed end 22 of the insert 20 contacts the closed end 32 of the bushing 30. The opening 26 in the insert 20 receives a bolt 70 (see FIGS. 17 and 18) when the battery 80 is connected to a load. The bushing 30 and the insert 20 have two sections in FIG. 9 designated as B-B and C-C, which are transverse sections. Section B-B is a section taken at a point inside the open end 34 of the bushing 30 and section C-C is a section taken at the end of the opening 26 in the insert 20.

Figure 10:
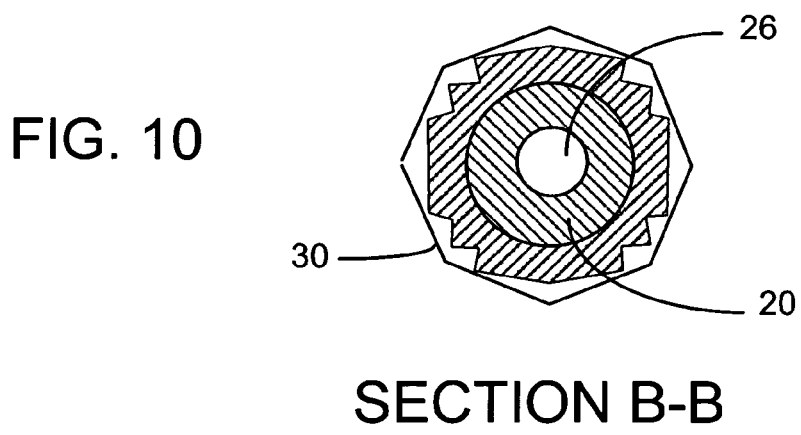
FIG. 10 is a sectional view of the closed end of the bushing and insert shown in FIG. 9.
Figure 11:
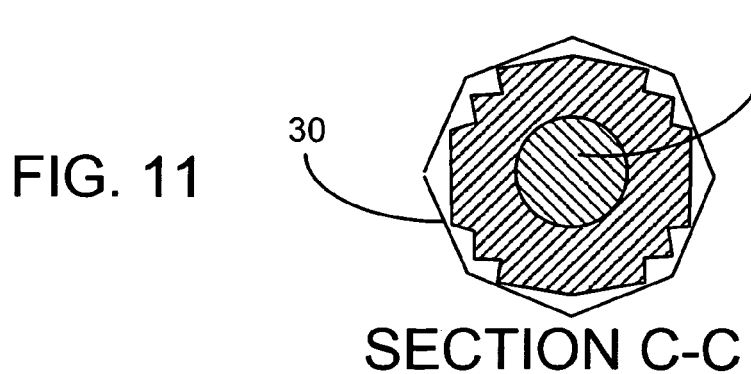
FIG. 11 is a sectional view of the mid-section of the bushing and insert shown in FIG. 9.

FIG. 10 shows section B-B of the bushing 30 and the insert 20 in FIG. 9 near the open end 34 of the bushing 30. A threaded opening 26 in the center of the insert 20 is designed to receive a bolt 70 (see FIGS. 17 and 18). FIG. 11 shows section C-C of the bushing 30 and the insert 20 in FIG. 9 near the mid-section of the bushing 30 and at the end of the opening 26 (i.e., at the back wall) in the insert 20.

Figure 12:
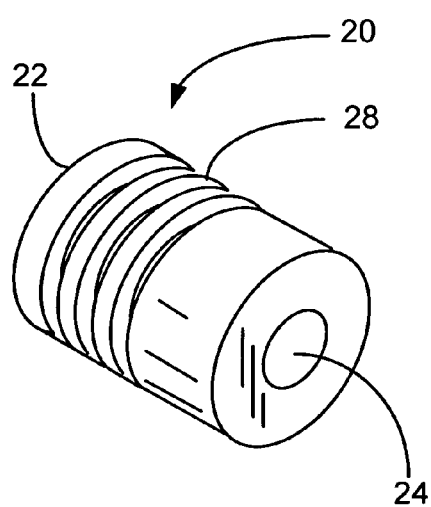
FIG. 12 is a perspective view of the insert used in preferred embodiments of the battery terminals of the present invention.
Figure 13:
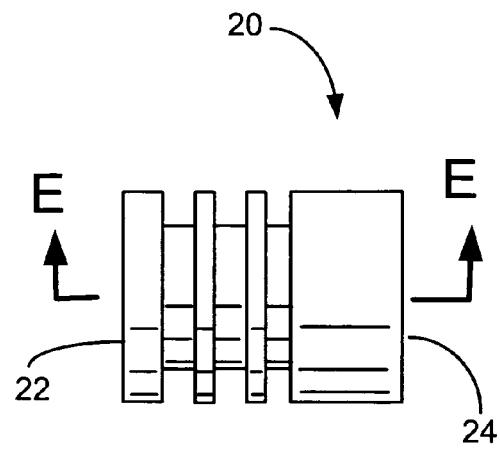
FIG. 13 is a side view of the insert shown in FIG. 12.

FIG. 12 shows an embodiment of an insert 20 of the present invention. The insert 20 has a closed end 22 and a threaded open end 24 that is designed to receive a bolt 70 (see FIGS. 17 and 18). The insert 20 is cylindrically-shaped and the exterior wall has a plurality of radial members 28 extending outwardly which engage the interior wall of the bushing 30 (FIG. 9). FIG. 13 is a side view of the insert 20 shown in FIG. 12 with a closed end 22, an open end 24 and a section designated as E-E taken through the longitudinal axis.

Figure 14:
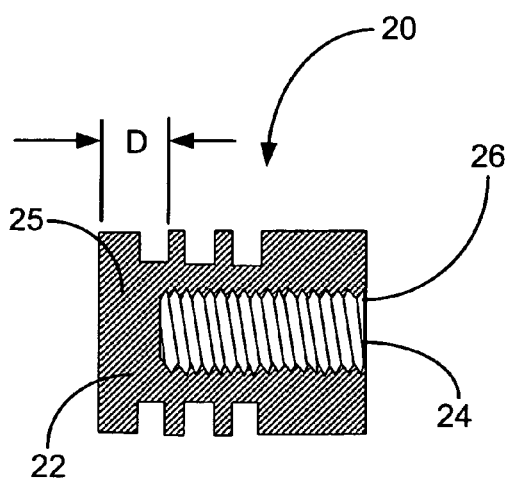
FIG. 14 is a sectional view of the insert shown in FIG. 13.
Figure 15:
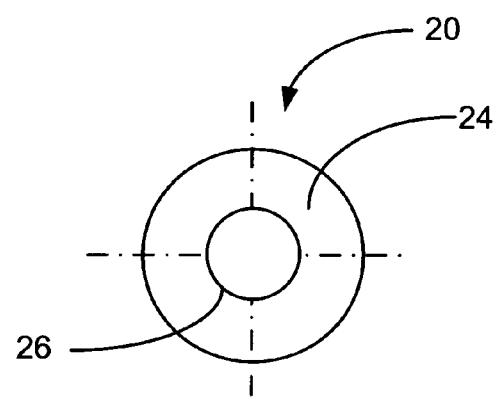
FIG. 15 is an end view of the insert shown in FIG. 13.

FIG. 14 shows section E-E of the insert 20 in FIG. 13 with an opening 26 extending from the open end 24 to a back wall 25 which has a thickness "D" measured from the bottom of the opening 26 to the closed end 22. FIG. 15 shows the open end 24 of the insert 20 in FIG. 13 with the opening 26 along the longitudinal axis.

Figure 16:
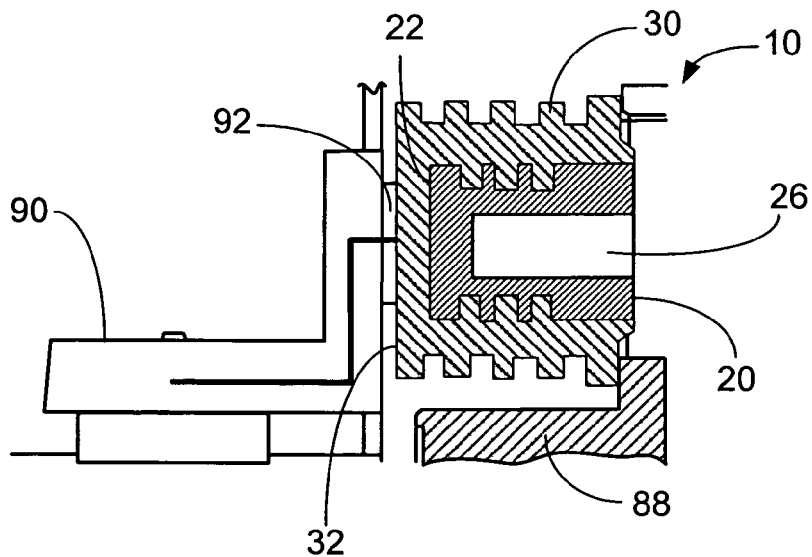
FIG. 16 is a side view of an embodiment of the battery terminal.
Figures 17, 18:
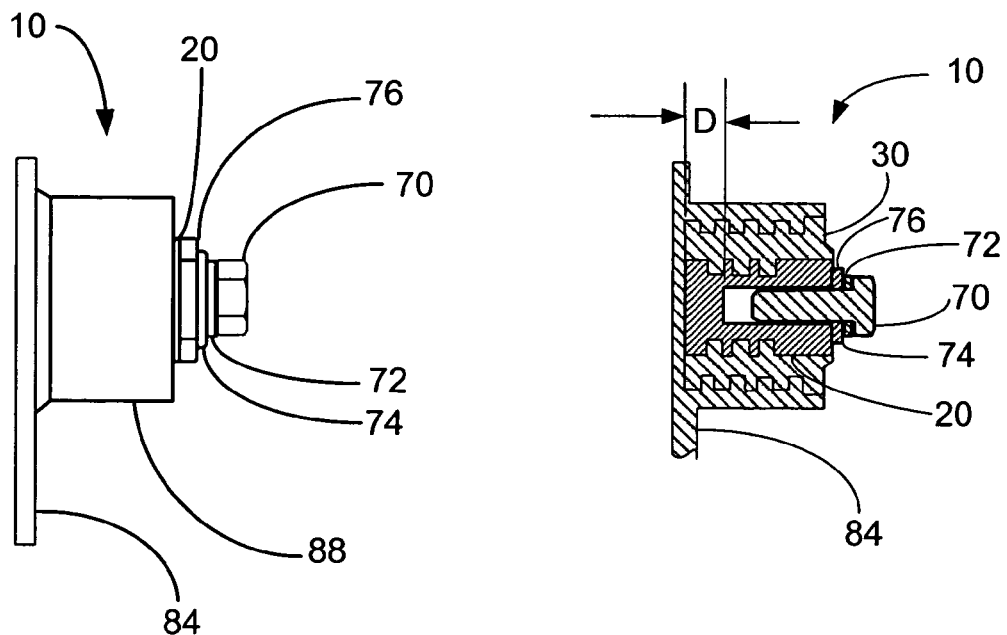
FIG. 17 is a side view of an embodiment of the battery terminal with a bolt threaded into the insert.
FIG. 18 is a sectional view of the battery terminal shown in FIG. 17.

FIG. 16 is a side view of an embodiment of a battery terminal 10 molded into a battery casing 88 with a threaded opening 26 in the insert 20 for receiving a bolt 70 (FIGS. 17 and 18). The terminal 10 is connected via the connector 90 to the battery plate (not shown) by the weld zone 92 where the closed end 32 of the bushing 30 is welded to the connector 90 inside the battery.

FIG. 17 is a side view and FIG. 18 is a side sectional view of an embodiment of the battery terminal 10 with a bolt 70 threaded into the insert 20. In between the bolt 70 and the insert 20 are a lock washer 72, a washer 74 and a copper busbar 76. The busbar 76 connects the battery 80 to a load.

Figure 19:
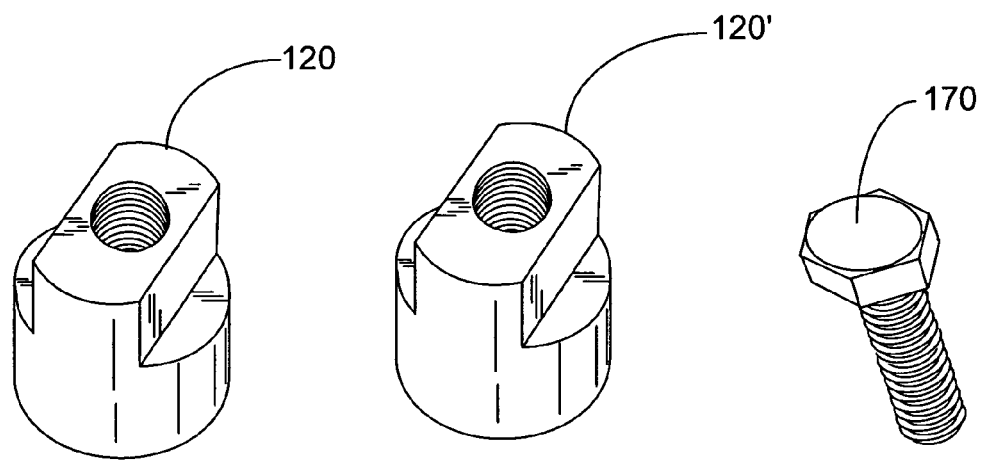
FIG. 19 is a perspective view of two different inserts and a stainless steel bolt that were used in tests.
Figure 20:
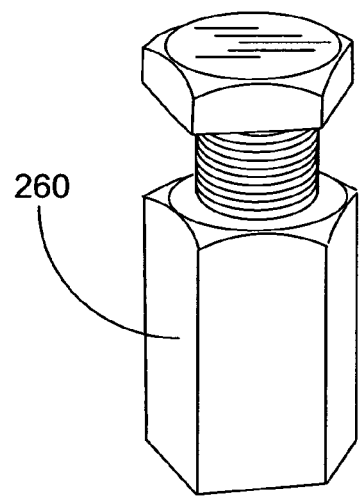
FIG. 20 is a perspective view of a coupling nut and stainless steel bolt that were used in tests.

FIG. 19 shows a brass insert 120, a copper insert 120' and a stainless steel bolt 170 similar to the inserts and bolts used in the tests described below. FIG. 20 shows a coupling nut 260 and a stainless steel bolt 270 similar to the coupling nuts and stainless steel bolts that were used in the tests described below.

Tests were conducted to predict the torque necessary to produce a failure mode for the insert back wall deformation, the insert thread strip and the bolt breakage. These three failure modes were determined to be the most likely result from applying an excessive torque to a correct length bolt or an overlong bolt at the battery connection. A calibrated digital torque wrench was used to measure the force applied to a bolt. Since actual torque values can vary based on the individual user, all torquing was performed by the same individual to minimize variations caused by the user. The inserts and bolts were obtained from commercial hardware suppliers. The factors and levels of the experiments are shown in Tables 1, 3 and 5.

The inserts were machined out of 360 brass (also referred to as Alloy 360 or Brass 360—an alloy mixture of copper and zinc with a small amount of lead) and C14500 copper (a phosphorus deoxidized, tellurium bearing copper alloy) roll stock. For most of the tests, the bolts were made of 18-8 stainless steel. However, a black oxide alloy steel bolt was used to measure insert thread strength in order to obtain torque values above the break point of an 18-8 stainless steel bolt. Fixtures were fabricated to hold the inserts in place during testing. A calibrated digital gauge was affixed to the fixture and used to determine the level of back wall deformation. Coupling nuts were used in the tests for determining bolt strength.

The insert samples made as described above were torqued to about 196 to 198 in-lb and the resulting back wall deformation averaged 0.011 inch, which is in line with the predicted result. Additional testing confirmed that a back wall deformation of 0.010 inch has no adverse effects on the terminal weld zone.

Measurement of the insert back wall deformation was carried out by mounting the insert in a fixture held in a vise, zeroing the digital gauge and driving the overlong bolt into the insert, while monitoring and recording the torque value and the corresponding deformation of the back wall of the insert. The insert back wall test factors, levels and runs are listed below in Table 1.

TABLE 1

Insert back wall test factors, levels and runs

| Run # | Back Wall Thickness (in) | Thread Diameter (in × thread count) | Material |
|---|---|---|---|
| 1 | 0.075 | ¼ × 20 | Copper |
| 2 | 0.170 | ¼ × 20 | Brass |
| 3 | 0.125 | 5/16 × 18 | Brass |
| 4 | 0.170 | 5/16 × 18 | Copper |
| 5 | 0.075 | ⅜ × 16 | Brass |
| 6 | 0.125 | ⅜ × 16 | Copper |

Five tests were performed for each different insert back wall thickness, using new bolts and inserts for each test. Failure modes were defined for each condition. A back wall deformation of greater than 0.010 inch was considered a failure. Based on previous testing, it was determined that greater than 0.010 inch was the point at which the degree of back wall deformation to torque value ratio increased dramatically. A summary of the test results is shown below in Table 2.

TABLE 2

Insert back wall test results summary

| Design Dimension | Design Material | Thread Size | Design Torque to Failure, Mean (in-lb) | Design Torque to Failure, Std. Dev (in-lb) |
|---|---|---|---|---|
| 0.190" | Brass | ¼" × 20 | 193.9 | 10.6 |

The tests for the back wall thickness determined that the type of material used to make the insert (e.g., brass or copper) was not statistically significant to the torque value required to cause a failure. Using a ¼"×20 stainless steel bolt and a 360 brass insert, the test results indicated that a back wall thickness of 0.190 inch would require a torque of greater than 193.9 in-lb to fail. Three inserts with a 0.190 inch back wall thickness were tested to verify the results. The bolts in the inserts were torqued to about 196 to 198 in-lbs and the average deformation was measured to be 0.011 inch.

The thread strength of the insert was measured by mounting the insert in a fixture held in a vise, placing hardened steel washers between the bolt and the insert to provide a known length of engagement (i.e., the length of the bolt extending into the insert) and driving the bolt into the insert until the threads of the insert stripped, while monitoring and recording the torque value. A black oxide alloy steel bolt was used in place of a stainless steel bolt for these tests because the stainless steel bolts broke before the threads failed. Five tests were performed for each type of insert, using new bolts and inserts for each test. The insert thread strength factors, levels and runs are shown in Table 3 and the summary of the insert thread test results are shown in Table 4.

TABLE 3

Insert thread strength test factors, levels and runs

| Run # | Engagement (in) | Thread Diameter (in × thread count) | Insert Material |
| --- | --- | --- | --- |
| 1 | 0.150 | ¼ × 20 | Brass |
| 2 | 0.280 | ¼ × 20 | Copper |
| 3 | 0.210 | 5/16 × 18 | Copper |
| 4 | 0.280 | 5/16 × 18 | Brass |
| 5 | 0.150 | 3/8 × 16 | Copper |
| 6 | 0.210 | 3/8 × 16 | Brass |

TABLE 4

Insert thread test calculations

| Design Dimension | Length of Engagement | Design Material | Design Torque to Failure, Mean (in-lb) | Design Torque to Failure, Std. Dev (in-lb) |
| --- | --- | --- | --- | --- |
| ¼" × 20 × 0.625" | 0.388" | Brass | 344.9 | 38.7 |

The tests for the thread strength determined that all input factors were significant to the torque value required to cause failure. A bolt size of ¼"×20×0.625" with the standard corresponding installation hardware of one 0.062 inch thick lock washer, one 0.050 inch thick flat washer and one 0.125 inch thick bus bar resulted in a length of engagement between the bolt and the insert of 0.388 inch. With this stack up of lock washer, flat washer and bus bar, a failure torque value of 344.9 in-lb was calculated.

Tests were conducted to determine the bolt strength under two conditions which are referred to herein as "unsupported bolt head" and "supported bolt head" conditions. A "supported bolt head" condition exists when an obstruction between the bolt and the insert back wall prevents the end of the bolt from contacting the back wall of the insert. An "unsupported bolt head" condition exists when the end of the bolt contacts the back wall of the insert. The bolt strength factors are listed in Table 5 and the results for the "unsupported bolt head" and "supported bolt head" conditions are shown in Table 6.

TABLE 5

Bolt strength factors

| Run # | Head supported | Thread Diameter (in × thread count) | Material |
| --- | --- | --- | --- |
| 1 | Yes | ¼ × 20 | Stainless Steel |
| 2 | No | ¼ × 20 | Stainless Steel |

The unsupported bolt strength experiment included driving a first bolt fully into one end of a coupling nut (see FIG. 20) mounted in a vise, driving a second bolt fully into the opposing end of a coupling nut until contact was made with the first bolt near the mid-portion of the nut, continuing to drive the second bolt until the bolt broke, while monitoring and recording the torque value. Fifteen bolts were tested, using new bolts and coupling nuts for each test. The average torque value necessary to break a ¼"×20 18-8 stainless steel bolt with an unsupported head was 180.7 in-lb.

The supported bolt strength experiment included driving a bolt fully into one end of a coupling nut mounted in a vise until the bolt broke, while monitoring and recording the torque value. Eighteen bolts were tested, using new bolts and coupling nuts for each test. The average torque value necessary to break a ¼"×20 18-8 stainless steel bolt with a supported head was 202.7 in-lb.

TABLE 6

Bolt strength results summary

| Design Dimension | Design Material | Design Torque to Failure, Mean (in-lb) | Design Torque to Failure, Std. Dev (in-lb) |
| --- | --- | --- | --- |
| ¼" × 20 × 0.750" (Unsupported head) | 18-8 Stainless Steel | 180.7 | 6.3 |
| ¼" × 20 × 0.750" (Supported head) | 18-8 Stainless Steel | 202.7 | 11.9 |

In summary, excessive insert back wall deformation which disrupts the front terminal weld can lead to catastrophic battery failure. Therefore, it is desirable that the bolt break prior to insert deformation. A 360 brass insert back wall thickness of 0.190 inch results in a ¼"×20 18-8 stainless overlong bolt head breaking prior to a back wall deflection of greater than 0.010 inch. A ¼"×20×0.625" bolt with a supported head and a length of engagement of at least 0.388 inch will break prior to the insert threads stripping.

Thus, while there have been described the preferred embodiments of the present invention, those skilled in the art will realize that other embodiments can be made without departing from the spirit of the invention, and it is intended to include all such further modifications and changes as come within the true scope of the claims set forth herein.

We claim:

1. A threaded battery terminal for a molded battery casing comprising a perimetrical side wall that defines an interior of the molded battery casing, the threaded battery terminal comprising:
   a bushing having an axial bore extending between an open end and a closed end; and
   an insert having a longitudinal axis and a threaded opening extending along the longitudinal axis between an open end and a back wall, wherein the back wall has a thickness of from 0.170 to 0.190 inches,
   wherein the insert is formed within the bushing and the threaded opening is adapted to receive a bolt, wherein the bushing does not extend into the interior of the molded battery casing, wherein when the bolt has a thread engagement of 0.235 inches or more, the bolt breaks before the threads are damaged by continued rotation of the bolt, and wherein the back wall deforms less than or equal to 0.010 inch when an over-long bolt is threaded into the opening and contacts the back wall with a torque of less than 193.9 in-lb force.

2. The threaded battery terminal according to claim 1, wherein the insert is made from brass or copper and the bushing is made from lead.

3. The threaded battery terminal according to claim 1, wherein the insert is formed in the bushing by a molding process.

* * * * *